No. 854,747. PATENTED MAY 28, 1907.
R. E. LINCOLN.
SPEED CHANGING GEARING.
APPLICATION FILED SEPT. 1, 1906.
2 SHEETS—SHEET 1.
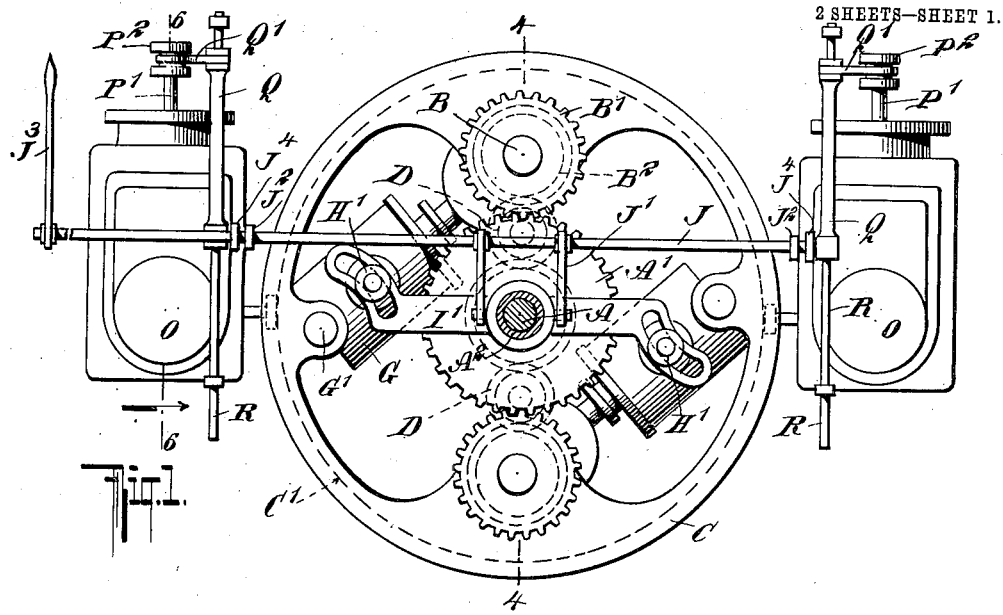
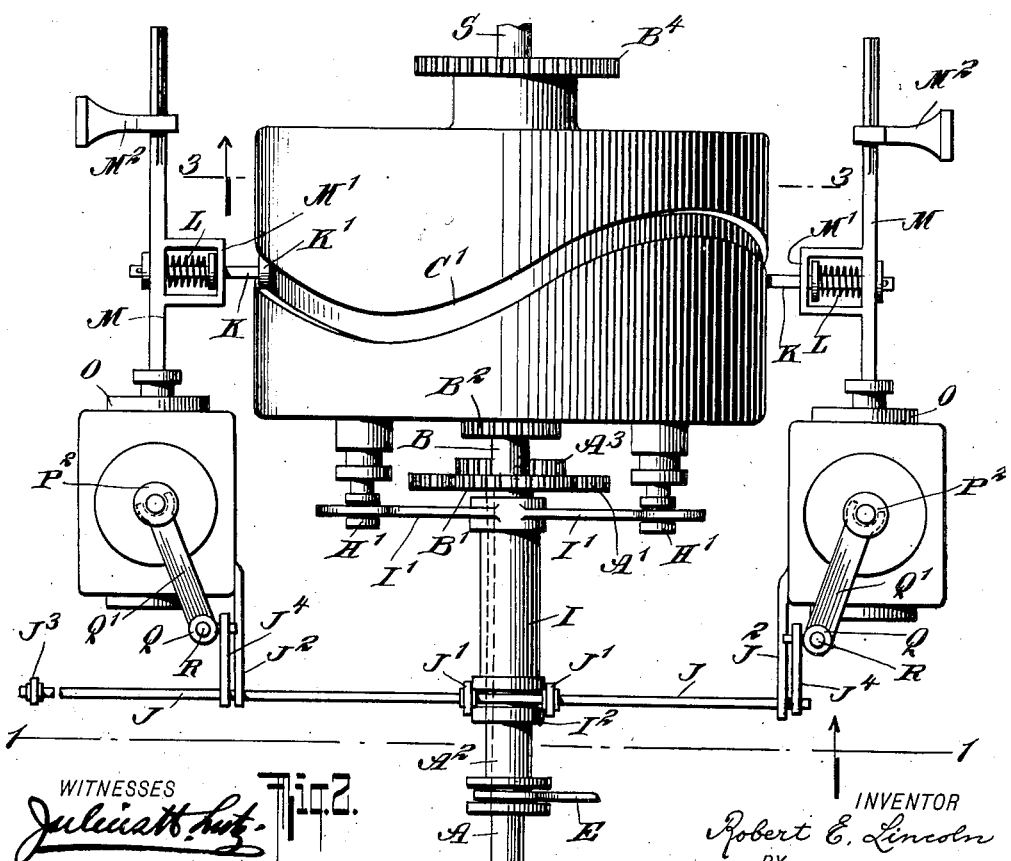
WITNESSES
Juliuatt Lutz
John Lotka
INVENTOR
Robert E. Lincoln
BY
Briesen Knauth
ATTORNEYS

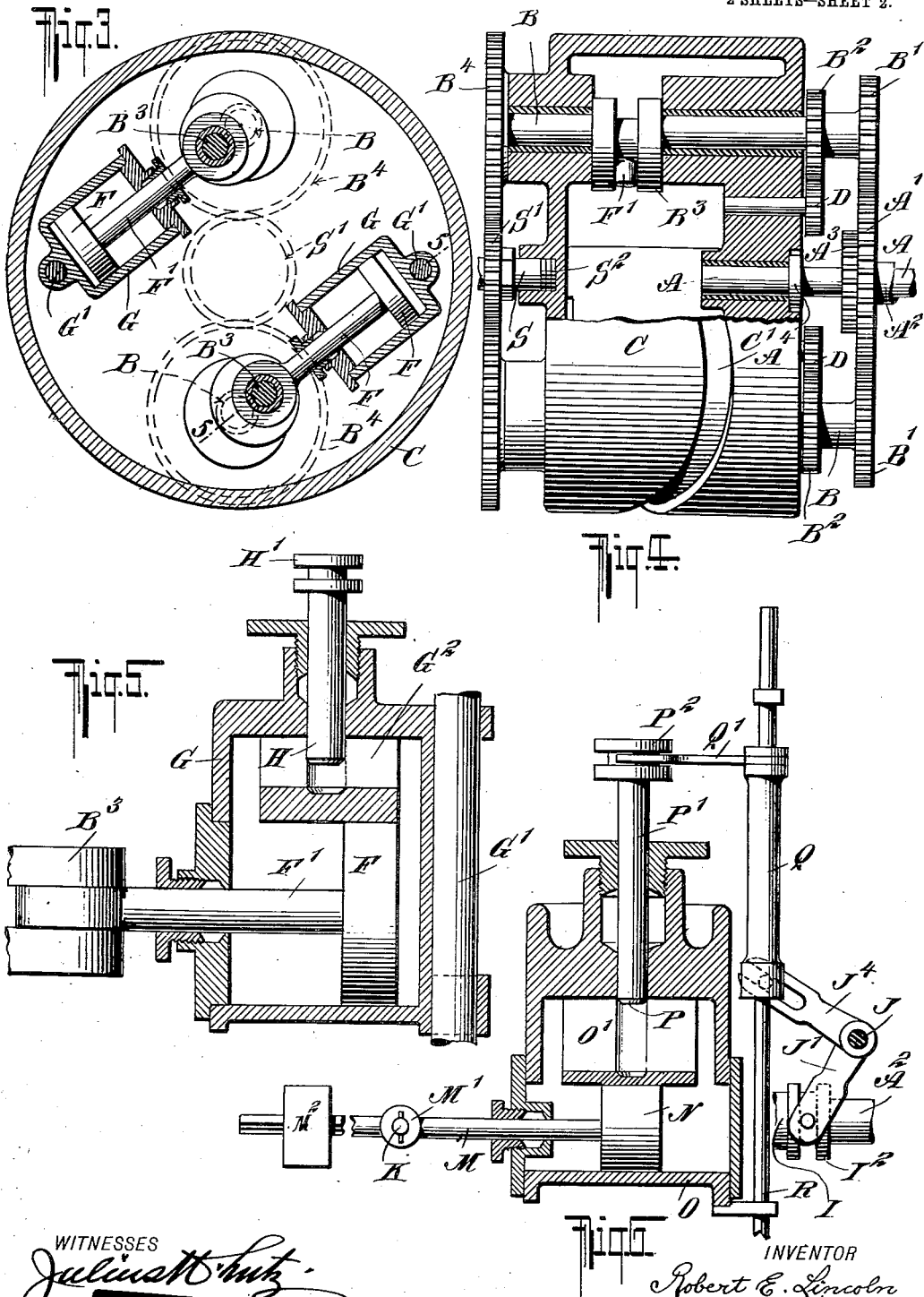

UNITED STATES PATENT OFFICE.

ROBERT E. LINCOLN, OF JERSEY CITY, NEW JERSEY.

SPEED-CHANGING GEARING.

No. 854,747.  Specification of Letters Patent.  Patented May 28, 1907.

Application filed September 1, 1906. Serial No. 332,903.

*To all whom it may concern:*

Be it known that I, ROBERT E. LINCOLN, a citizen of the United States, and a resident of Jersey City, Hudson county, State of New Jersey, have invented certain new and useful Improvements in Speed-Changing Gearing, of which the following is a specification.

My invention relates to devices for transmitting rotary motion at a variable rate of speed, and has for its object to provide a compact mechanism for changing the speed gradually while securing a relatively high degree of efficiency. The preferred form of my invention also enables the driven shaft to be reversed, if desired.

Reference is to be had to the accompanying drawings, in which

Figure 1 is a front elevation of my improved speed-changing gear (the shaft and a surrounding sleeve being in section on line 1—1 of Fig. 2); Fig. 2 is a plan thereof; Fig. 3 is a cross section on line 3—3 of Fig. 2; Fig. 4 is partly a longitudinal vertical section on line 4—4 of Fig. 1, and partly a side elevation; Fig. 5 is a section substantially on line 5—5 of Fig. 3; and Fig. 6 is a vertical section on line 6—6 of Fig. 1.

A designates the driving shaft suitably supported in bearings and having a driving gear A' mounted to turn therewith. When it is not desired to make the apparatus reversible, the gear A' is secured to the shaft A rigidly. In the construction illustrated however, provision is made for reversing the direction of rotation, and for this purpose the gear A' is secured to a sleeve $A^2$ movable lengthwise of the shaft, but held to rotate therewith by means of a key or other connecting devices. The gear A' is shown in engagement with two pinions B' secured to shafts B which are journaled in the rotatable carrier C. These shafts also carry pinions $B^2$ in permanent mesh with intermediate pinions D journaled on the carrier C. The sleeve $A^2$ carries a reversing gear wheel $A^3$ adapted to engage the intermediate pinions D when the sleeve is shifted lengthwise by means of any suitable mechanism, such as the shifting fork E. It will be readily understood that the shafts B will be rotated in one direction or the other, according as the gears A', B' or $A^3$, D are brought into mesh.

The shafts B are provided with cranks or eccentrics $B^3$ which are engaged loosely by rods F' secured to pistons F arranged to reciprocate in cylinders G. These cylinders are pivoted to carrier C at G', about axes parallel with the carrier's axis of rotation. The cylinders may simply contain air, or they may be filled with water, oil, or other suitable fluid. Each cylinder has a passage $G^2$ connecting its opposite ends, and the area of such passage may be varied, or the passage may be closed altogether, by means of a valve H, mounted to slide in the cylinder in a direction parallel with the shaft A. Each valve stem has a head or collar H' engaged by an arm I' projected from a sleeve I mounted loosely on the sleeve $A^2$ so as to be capable of sliding thereon and also of turning relatively thereto. It will be obvious that by moving the sleeve I lengthwise of the shaft A, the valves H may be opened or closed. This shifting of the sleeve I may be accomplished by means of crank arms J' projected from a rock shaft J and engaging a grooved collar $I^2$ on the sleeve I. The shaft which is journaled in stationary bearings may be rocked by means of a lever $J^3$ having any approved means for holding it in position after adjustment.

The carrier C is provided in its periphery with a cam groove or S-groove C' into which project at diametrically opposite points, rollers K' mounted on the ends of the rods K pressed toward the carrier by the springs L and mounted to slide on piston rods M and in guides M' rigidly connected with said rods. The pistons N, to which the rods M are secured, reciprocate in a direction parallel with the shaft A, in stationary cylinders O each similar to the cylinders G in that they have passages O' leading from one end of the cylinder to the other and controlled by adjustable valves P. The piston rods M may be steadied by guides $M^2$.

The mechanism for adjusting the valves P is connected with that of the valves H in such a manner that when one set of valves is moved toward the open position, the other is moved toward the closed position, and vice versa. This may be accomplished by having the heads $P^2$ of the valve stems P' engaged by arms Q' projected from slides or sleeves Q movable along suitable stationary guides R and connected loosely with the crank arms J⁴ at the outer portions of the rock shaft J. The shafts B, at the ends opposite the shaft A, carry pinions B⁴ engaging a gear wheel S' on the driven shaft S, arranged in axial alinement with the shaft A. Instead of making the roller rods K slide in unison with the piston rods M, they may be constructed as elbow levers fulcrumed on stationary supports and pivotally connected with the said piston rods.

The cam groove C' is preferably so proportioned that the pistons N will have the same number of strokes per revolution of the carrier C as the pistons F when the valves H as well as the valves P are half-closed. While I have shown a single cam groove for both rollers K', I might provide a separate one for each of them. The end thrust due to the reaction of the rollers K' on the walls of the cam C' may be taken up by a collar A⁴ on the shaft A and fiber disks S² or the like interposed between the casing C and the inner end of shaft S.

While I have referred to the shaft A as the drive shaft and the shaft S as the driven shaft, these functions may be reversed, and in fact I should prefer to apply the power to the shaft S.

In operation, assuming the valves H to be fully open, and therefore the valves P fully closed, then as the shafts B are rotated (either through the gearing S', B⁴, or A', B', or A³, D, B³, as the case may be), the carrier C will be held absolutely stationary, since the closing of the valves P prevents a reciprocation of the pistons N and therefore a corresponding movement of the rollers K'. The rotation of the shafts B in the stationary carrier will cause the pistons F to reciprocate idly, since with the valves H fully open there is no resistance to the movement of the pistons F beyond friction. In this case therefore, power will simply be transmitted from the shaft S to A (or vice versa) through the gears S', B⁴ and B', A', or S', B⁴ and B³, D, A³ according to the position given to the sleeve A² by the fork E or other shifting device. In the construction shown, the relative speed of the two shafts would be about as 2 to 1, under the conditions just assumed, but of course this rate may be varied by properly proportioning the number of teeth on the several gear wheels. Let us now assume the other extreme position, in which by rocking the shaft J the valves H have been closed fully and the valves P opened entirely. In this case, as the air or other fluid contained in the cylinders G cannot pass from one end thereof to the other, the confined fluid will oppose such a resistance to the reciprocation of the pistons F as to make it impossible for the shafts B to rotate relatively to the carrier C. The latter will therefore be locked to both shafts A and S, so that both will rotate at the same speed. The valves P being opened (as shown in Fig. 6), there is no resistance to the reciprocation of the pistons N actuated by the cam grooves C' of the carrier through the medium of the rollers K' and rods K, M. We therefore have one extreme case in which both shafts A and S rotate in unison with each other and with the carrier C, and another extreme case in which the carrier is stationary and one shaft is driven from the other at a rate of speed depending upon the ratio of gearing employed. If the shaft J is rocked to an intermediate position, each of the valves H, P will be partly open and an intermediate rate of speed will be obtained. If the shaft S is used as the driver, the carrier C would revolve in the same direction as the shaft, but at a lower speed, and the shaft A would be driven at a higher rate of speed than when the valves H are fully open, but a lower rate of speed than when the valves H are entirely closed. The nearer the valves H are brought the closed position, the greater the speed of the shaft A if it be the driven shaft. With the construction shown, and using the shaft S as the driving shaft, I can obtain any speed from equal speed of both shafts down to the limit determined by the ratio of gearing. Of course, if the shaft A is used as the driving shaft, the reverse operation will take place, that is, opening the valves H will increase the speed of the driven shaft S, and the speed of such driven shaft may be varied from a speed equal to that of the driving shaft up to the limit determined by the ratio of gearing.

The pistons N and cylinders O constitute a device for opposing a variable resistance to the rotation of the carrier C, and the pistons F with their cylinders G constitute means for opposing a variable resistance to the rotation of the shafts B relatively to their carrier C. The speed may be varied gradually without shocks while the engine is running, by rocking the shaft J one way or the other. The driven shaft is reversed by shifting the sleeve A².

I might in some cases secure the carrier C rigidly to one of the shafts, say the shaft S, thus omitting the gears S', B⁴. In such a case, the highest speed of the driven shaft S would be equal to that of the drive shaft A (when the valves H are closed) and the drive shaft could rotate with the driven shaft stationary if the valves H were fully opened. The objection to this arrangement is that very little power would be available for starting (on the low speed) and the arrangement shown avoids this difficulty by providing a gearing or connection which will efficiently transmit power even when the carrier C is stationary. That is, in the preferred form of my invention, the carrier C has a toothed gear connection with both the driving shaft and the driven shaft. The invention is applicable to automobiles and other machines.

I claim as my invention:

1. A speed changing mechanism, comprising a rotatable carrier, a drive shaft and a driven shaft co-axial with said carrier, a transmitting shaft journaled on the carrier, toothed gears connecting the transmitting shaft both with the drive shaft and with the driven shaft, a device for opposing a variable resistance to the rotation of the carrier, another device for opposing a variable resistance to the rotation of the transmitting shaft relatively to the carrier, and a connection between said devices so arranged that when the resistance to the carrier's rotation is increased the resistance to the rotation of the transmitting shaft will be diminished, and vice versa.

2. A speed changing mechanism, comprising a rotatable carrier, a piston arranged to be reciprocated by the rotation of the carrier, a device for opposing a variable resistance to the reciprocation of said piston, a drive shaft and a driven shaft co-axial with the carrier, a transmitting shaft journaled on the carrier, gears connecting said transmitting shaft both with the drive shaft and with the driven shaft, a piston connected with said transmitting shaft and carried by the carrier so as to rotate therewith, a device for opposing a variable resistance to the reciprocation of the last mentioned piston, and a connection between said devices so arranged that when the resistance to the carrier's rotation is increased the resistance to the rotation of the transmitting shaft will be diminished, and vice versa.

3. A speed changing mechanism, comprising a rotatable carrier, a transmitting shaft journaled thereon so as to rotate therewith, a drive shaft co-axial with the carrier and having a driving connection with the transmitting shaft, a device for opposing a variable resistance to the rotation of the carrier, another device for opposing a variable resistance to the rotation of the transmitting shaft relatively to the carrier, and a connection between said devices so arranged that when the resistance to the carrier's rotation is increased the resistance to the rotation of the transmitting shaft will be diminished, and vice versa.

4. A speed changing mechanism, comprising a rotatable carrier, a piston adapted to be reciprocated by the rotation of the carrier, a transmitting shaft journaled on the carrier so as to revolve therewith, a piston carried by the carrier and arranged to be reciprocated by the rotation of the transmitting shaft relatively to the carrier, individual devices for opposing a variable resistance to the reciprocation of the aforesaid pistons, a drive shaft co-axial with the carrier and in driving connection with the transmitting shaft, and a connection between said devices so arranged that when the resistance to the carrier's rotation is increased the resistance to the rotation of the transmitting shaft will be diminished, and vice versa.

5. A speed changing mechanism, comprising a rotatable carrier, a drive shaft co-axial therewith, a transmitting shaft journaled on the carrier and operatively connected with the drive shaft, an oscillating cylinder pivoted to the carrier, a piston within said cylinder, a driving connection from the transmitting shaft to said piston, and an adjustable valve for varying the resistance opposed to the reciprocation of the piston.

6. A speed-changing mechanism, comprising a rotatable carrier, a drive shaft co-axial therewith, a transmitting shaft journaled on the carrier and operatively connected with the drive shaft, an oscillating cylinder pivoted to the carrier, a piston within said cylinder, a driving connection from the transmitting shaft to said piston, a valve movable in said cylinder in a direction parallel to the carrier's axis, and means for adjusting said valve to vary the resistance opposed to the reciprocation of the piston.

7. A speed-changing mechanism, comprising a rotatable carrier, a drive shaft co-axial therewith, a transmitting shaft journaled on the carrier and in driving connection with the drive shaft, a cylinder carried by the carrier so as to revolve therewith, a piston in said cylinder, a driving connection from the transmitting shaft to said piston, a valve movable in said cylinder in a direction parallel to the carrier's axis, and means for adjusting said valve to vary the resistance opposed to the reciprocation of the piston.

8. A speed-changing mechanism, comprising a rotatable carrier, a drive shaft co-axial therewith, a transmitting shaft journaled on the carrier and in driving connection with the drive shaft, a cylinder carried by the carrier so as to revolve therewith, a piston in said cylinder, a driving connection from the transmitting shaft to said piston, a valve controlling a passage which connects the opposite ends of said cylinder, said valve being movable in a direction parallel to the carrier's axis, and means for adjusting said valve to vary the resistance opposed to the reciprocation of the piston.

9. A speed-changing mechanism, comprising two shafts and a carrier arranged to rotate about the same axis, a transmitting shaft journaled on the carrier eccentrically, an adjustable device for opposing a variable resistance to the rotation of the transmitting shaft relatively to the carrier, two gears on the transmitting shaft, an intermediate gear journaled on the carrier and in mesh with one of said gears, and a longitudinally slidable reversing sleeve held to rotate with one of the first-named two shafts and carrying two gears adapted to mesh respectively with the other gear of the transmitting shaft and with the intermediate gear, according to the position of the sleeve.

In witness whereof I have hereunto signed my name in the presence of two subscribing witnesses.

ROBERT E. LINCOLN.

Witnesses:
 JOHN LOTKA,
 RUDOLPH ABERLI.